Figure 1:
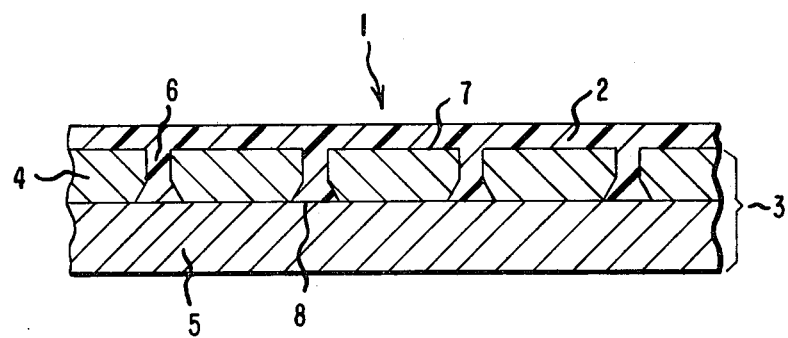
Figure 2:
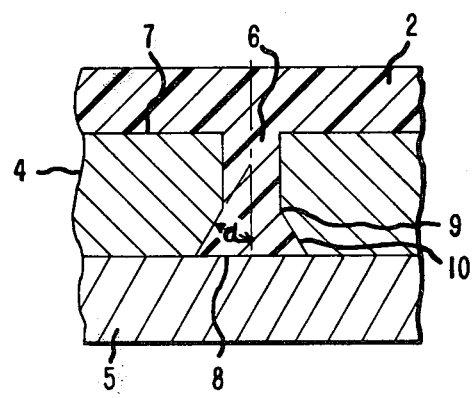

United States Patent [19]

Houston

[11] 4,004,774
[45] Jan. 25, 1977

[54] COATED PANEL

[75] Inventor: Alvin John Houston, Dollard des Ormeaux, Canada

[73] Assignee: Du Pont of Canada Limited, Montreal, Canada

[22] Filed: Jan. 8, 1975

[21] Appl. No.: 539,596

[52] U.S. Cl. .............................. 249/114; 249/134; 249/189; 427/291; 428/139; 428/512; 428/461; 428/468; 428/479; 428/481; 428/490

[51] Int. Cl.² ...................... B28B 7/36; E04G 9/05

[58] Field of Search ............ 52/473, 673, 622, 615; 428/138, 139, 140; 249/134, 189–191, 127, 114, 112; 156/244, 91, 293; 427/290–292

[56] References Cited

UNITED STATES PATENTS

| | | | |
|---|---|---|---|
| 694,111 | 2/1902 | Schratwieser | 52/673 |
| 1,278,270 | 9/1918 | Wilber | 428/139 |
| 1,569,947 | 1/1926 | Butress | 52/673 |
| 1,664,875 | 4/1928 | Cowan | 52/673 |
| 2,075,373 | 3/1937 | Tomec | 428/139 |
| 2,157,456 | 5/1939 | Koyemann | 427/291 |
| 2,366,274 | 1/1945 | Luth et al. | 156/293 |
| 3,173,991 | 3/1965 | Breakfield | 428/140 |
| 3,507,739 | 4/1970 | Jacobs | 428/139 |
| 3,759,481 | 9/1973 | Scott | 249/112 |
| 3,770,560 | 11/1973 | Elder et al. | 428/138 |

FOREIGN PATENTS OR APPLICATIONS 361,012  11/1931  United Kingdom ............... 156/293

Primary Examiner—George F. Lesmes
Assistant Examiner—R. J. Roche

[57] ABSTRACT

A composite structure having a coating of thermoplastic material on a substantially inflexible substrate is disclosed. The composite structure comprises (a) a substantially inflexible substrate having a plurality of orifices in the surfaces thereof that is coated, the orifices being of a shape such that, at least in part, the cross-sectional area of the orifices increases as the distance from the surface of the substrate increases, and (b) a coating of solid thermoplastic material on the surface of the substrate. The thermoplastic material extends into the orifices at least as far as into the portion of the orifice of increasing cross-sectional area. Preferably the cross-sectional area of the orifices is greater than 0.005 square inches and the thickness of the coating is at least 10 mils. The substrate is preferably a cellulosic material, e.g., wood, hardboard plywood and the like, or metal. The thermoplastic material may be asphalt, bitumen, tar or a thermoplastic polymer, especially polyethylene.

8 Claims, 2 Drawing Figures

COATED PANEL

The present invention relates to improved composite structures especially composite structures in the form of panels coated with thermoplastic materials. In particular, the invention relates to coated panels having improved bonding of the coating, especially relatively thick coatings, to the substrate of the panel.

Techniques for the coating or lamination or a substrate with thermoplastic materials to form coated panels are known. For example, the substrate and the thermoplastic material in the form of film or sheet may be brought into contact and laminated by the application of heat and pressure. Alternatively, the panel substrate may be coated with thermoplastic material in a heated, and especially in a molten, form; adhesion of the thermoplastic material to the substrate is usually enhanced by applying pressure to the coated panel before the thermoplastic material cools. Adhesives may be applied to the substrate before the substrate is coated with the thermoplastic material. Alternatively, adhesion promoting compounds may be applied to the substrate or incorporated into the thermoplastic material.

Coated panels may be used in a variety of end uses. For example, polyolefin-coated wooden panels may be used as concrete form boards as is disclosed by D. H. Dawes and J. P. van den Steen in Canadian Patent 931,486 which issued Aug. 7, 1973. Coated panels may also be used in the construction industry in interior and exterior applications.

For some end uses it is important that the adhesion of the coating to the substrate remain at a level acceptable for the particular end use for the expected life of the coated panel. To obtain such adhesion it may be necessary to use adhesive systems that are of higher cost and/or to use alternate thermoplastic materials, for example, more readily adherable thermoplastic materials, that may be inferior to the desired thermoplastic material in other important properties. In some cases a satisfactory solution to the problem of obtaining acceptable adhesion of a suitable coating, especially a coating having a thickness of greater than 10 mils, to a substrate may not be attainable by known techniques.

It has now been found that a composite structure having a coating of thermoplastic material on a substantially inflexible substrate may be improved by mechanically attaching the thermoplastic material to the substrate.

Accordingly, the present invention provides a composite structure having a coating of thermoplastic material on a substantially inflexible substrate, said composite structure comprising:

a. a substantially inflexible solid substrate coated with a normally solid thermoplastic material, said substrate having a plurality of orifices at the coated surface, each having a cross-sectional area of at least 0.005 in.$^2$ disposed over at least the coated surface thereof and spaced with centers from 0.25 to 4 inches apart, said orifices leading into holes in said substrate whose cross-sectional area, for at least a part of their depth, increases at least 10% as the distance from the coated surface of the substrate increases, and b. said normally solid thermoplastic material forming a coating at least about 5 mils thick on the surface of said solid substrate and penetrating through said orifices into said holes for at least a distance such that the cross-sectional area is at least 10% greater than the area of the orifice at the coated surface of the solid substrate.

In preferred embodiments, the thermoplastic coating is at least 10 mils thick and is composed of a tough polyolefin resin such as high-density polyethylene or a linear copolymer of ethylene with a higher 1-olefin, for example, 1-butene, 1-pentene, 1-octene, 1-decene. In other embodiments the normally solid thermoplastic coating may be asphalt, tar, bitumen or another class of thermoplastic resin such as a polyamide, polyester, polymethylmethacrylate, an ionomer or an ethylene-vinyl acetate copolymer.

The substantially inflexible solid substrate can be any commonly available material of construction such as metal, wood, plywood or composition boards such as Masonite* and cellulosic particle board. The preferred material for the substrate for many uses is a cellulosic material such as plywood or particle board. While usually the substrate will be an essentially planar sheet, it may also be a preformed, contoured sheet.

*Trademark of Masonite Corporation

While in many embodiments of this invention, the holes will penetrate completely through the inflexible substrate, in other embodiments the substrate may itself be a laminated sheet in which the depth of each hole is less than the total thickness of the substrate; in the latter case the holes will penetrate only the first layer of the laminated, rigid substrate.

While the smallest effective orifices will have cross-sectional areas at the plane of the surface of the solid substrate of at least about 0.005 in.$^2$, preferred for many applications are orifices having cross-sectional areas at the plane of the surface of the solid substrate in the range of about 0.01–0.05 in.$^2$. In particular cases for very large constructions, even larger orifices having cross-sectional areas up to as much as 0.2–0.8 in.$^2$ can be employed.

While the holes in the solid, rigid substrate may have contours such that the cross-sectional area increases continually from the plane of the coated surface, in preferred embodiments the hole will have a constant cross-section for a portion of the depth of penetration and will then, at a junction line, increase in cross-sectional area. This increase at the junction line may be a sharp increase to at least 10% greater cross-sectional area or may be a more gradual, continuously expanding cross-sectional area, the increase commencing at said junction line. In the preferred embodiments the holes will be cylindrical; at the junction line inside the substrate either a larger cylindrical hole meets the first cylindrical hole or, in the most preferred embodiment, the circular orifice leads into a first, cylindrical portion of the hole extending from the coated surface of the solid substrate to a junction line, inside the solid substrate, with a frustoconical portion of the hole having sides which are at an angle in the range of 20°–60° with the vertical axis of the hole and which then increases in diameter (and cross-sectional area) as it extends farther from the coated surface.

The present invention, which will generally be referred to hereinafter by reference to a coated panel, may be illustrated by the drawings in which:

FIG. I is a schematic representation of a preferred form of a coated panel of the present invention; and FIG. II is an enlarged schematic representation of an orifice and hole of the coated panel of FIG. I of the present invention.

In FIG. I the coated panel, indicated generally by 1, is comprised of a coating 2 and a substrate 3. Substrate 3 is a laminate and is comprised of two layers, viz first layer 4 and second layer 5, first layer 4 being the outer or coated layer. First layer 4 contains orifices leading into holes 6 which, in the embodiment shown, extend through first layer 4. Coating 2 contacts the outer surface 7 of first layer 4 and extends through the orifices into and through holes 6. In the particular embodiment shown the coating 2 in hole 6 also contacts surface 8 of the second layer 5 of substrate 3, surface 8 being the surface of second layer 5 exposed in hole 6.

An enlarged section of hole 6 is shown in FIG. II. In the embodiment shown, the cross-sectional area of hole 6 is approximately constant between outer surface 7 and juncture 9, juncture 9 being within hole 6 and between outer surface 7 and second layer 5. At any point in hole 6 the cross-sectional area of hole 6 is measured in the plane parallel to outer surface 7. Between juncture 9 and second layer 5 the cross-sectional area of hole 6 increases, relative to the area between juncture 9 and outer surface 7. In the embodiment shown the cross-sectional area increases continuously and linearly between juncture 9 and second layer 5, i.e., as the distance from outer surface 7 increases. Hole 6 is therefore, in the embodiment shown, actually a hole countersunk from the surface of first layer 4 tht is opposite outer surface 7. The rate of increase in cross-sectional area of hole 6 between juncture 9 and second layer 5 is indicated in FIG. II by the angle, α, formed by the edge 10 of hole 6 between juncture 9 and second layer 5 and by the axis of hole 6.

The shape of the cross-section of the orifice 6 may be varied over wide limits with circular shapes being preferred due to ease of manufacture. The manner in which the shape of the cross-section of hole 6 changes as it extends away from outer surface 7 may also be varied over a wide range within the restriction that the cross-sectional area of the holes 6 increases, at least in part, as the distance from the outer surface 7 increases. The preferred shapes for the holes, when viewed at right angles to the plane of the substrate, are the shape shown in the drawings and rectangular shapes. When viewed in the plane of the substrate the orifices may be symmetrical, for example, circular in cross-section, or elongated in one direction especially in the direction in which the substrate is coated during manufacture, i.e., the so-called "machine direction". The cross-sectional area of the orifices at outer surface 7 may be increased, compared to the area immediately adjacent to the outer surface 7, in order to facilitate the flow of thermoplastic material into the hole 6.

Inner layer 5 may be omitted from panel substrate 3 so that holes 6 extend through panel substrate 3.

The coating of thermoplastic material may be applied to the substrate in any of a number of ways. For example, a film or sheet of the thermoplastic material may be placed on the substrate and subjected to pressure, e.g., 0–1000 psig preferably 0–200 psig, while heating the thermoplastic material to facilitate flow of the thermoplastic material into the orifices under the influence of the pressure used in the process. It will, of course, be readily understood that pressure conditions useful in the manufacture of the coated panels of the present invention are interrelated with the temerature, and in particular with the relationship between temperature and the properties of the thermoplastic material that relate to the ease of flow of the material under the process conditions, for example, the melt viscosity of the thermoplastic material, and the period of time during which the heated thermoplastic material is subjected to pressure. Usually lower pressures will suffice at higher temperatures. While the mechanism for the attachment of the coating to the substrate is only partly understood, it is believed that shrinkage of the molten thermoplastic material on cooling may be an important factor in determining the strength of the bond between the coating and the substrate. An alternate method of applying the coating to the substrate where the holes penetrate through the substrate may be by application of a vacuum to the surface of the substrate opposite the coating.

Pressure and, if desired, heat treatment may be effected with heated presses of the types commercially available or by passing the substrate covered with thermoplastic material, for example, in the form of a sheet, through heated rollers under pressure. With some substrates, especially wood and the like, i.e, cellulosic materials, it may be desirable to surface dry the substrate. Since some thermoplastic materials tend to adhere to the surfaces of presses or rollers, it may be desirable to coat such surfaces with a suitable release agent, for example, a "Teflon" fluorocarbon polymer coating (trademark of E. I. du Pont de Nemours and Company). Other methods of applying the coating of thermoplastic material to the panel include such processes as extrusion coating, solution coating, dispersion coating, powder coating or fluidized bed coating. The process conditions must be such that the thermoplastic material flows into the orifices at least as far as into that part of the holes at which the cross-sectional area increases 10% as the distance from the surface increases.

The coating used on the panel is a thermoplastic material. Examples of such materials are asphalt, tar, bitumen and like materials, and thermoplastic polymers. The thermoplastic material must, of course, be capable of being applied as a coating and in particular of flowing into the orifices to the desired extent during the manufacture of the coated panel. The thermoplastic material must also be a solid under the conditions of the proposed end use of the coated panel and in particular at ambient temperatures.

Preferred thermoplastic polymers are polyamides, for example, polyhexamethylene adipamide, polyvinylchloride, and poly-α-olefins, for example, polystyrene, and polypropylene and especially homopolymers of ethylene and copolymers of ethylene and α-olefins, e.g., butene-1 or vinyl acetate. The thermoplastic material may contain fillers, pigments, stabilizers and/or reinforcing agents. The type and thickness of the coating will depend in particular on the proposed end use for the coated panel. The thickness should be such that an acceptably uniform coating is obtained, that the coating is of sufficient strength and/or stiffness for the designed use, and so that the coating can withstand the normal wear that it will be subjected to during the designed use of the coated panel. The coating should also be of a thickness required to give the desired properties to the coated panel, for example, impermeability to water. Preferred coating thicknesses are at least 10 mils and preferably in the range 30 to 100 mils, depending on the proposed end use.

For ethylene homopolymers and copolymers of ethylene and butene-1, as the polymer density increases the abrasion resistance of the polymer increases. Preferably, such polymers when used as the coating in the present invention have densities of at least 0.935 g/cm³ and especially at least 0.945 g/cm³. The melt indices of such polymers are preferably in the range of about 0.2–30.0, melt index being measured by the method of ASTM D-1238 (condition E).

Suitable polyethylenes may be obtained by any of the well known polymerization processes; using a coordination catalyst is a particularly useful route which may be adapted readily to provide homopolymers of ethylene as well as copolymers of ethylene and other α-monoolefins, e.g., butene-1.

The shape and cross-sectional area of the orifices and depth of the holes should be selected so as to achieve the desired bonding of the coating to the substrate. For example, if the cross-sectional area of the orifice is too small, the strength, for example, shear strength, of the thermoplastic material near the orifice may be the limiting factor in determining the strength of the bond between the coating and the substrate. The strength of the bond will also depend, in part, on the number and frequency of the orifices. Preferably the cross-sectional area of the orifices is at least 0.005 square inches and in particular in the range 0.01–0.05 square inches. Preferably the frequency of the orifices lies in the range where their centers are spaced symmetrically at distances from 0.5 to 2 inches although spacing in the range of 0.25 to 4 inches can be used.

The material used for the substrate and the thickness of the substrate should, of course, be selected so that the substrate is of a strength adequate for the proposed end use. The substrate material may be a factor in determining the size, shape and number of the holes, for example, for substrate materials of relatively low strength it may be desirable for juncture 9 of the embodiment illustrated in the drawings to be well away from both outer surface 7 and second layer 5. First layer 4 and/or second layer 5 may be laminated structures. The material for the substrate is a relatively inflexible material preferably wood and derived products, for example, plywood, chipboard, pressed fibrous boards, hardboard and the like; metals, for example, stainless steel and aluminum, and asbestos materials can also be used.

In the composite structures of the present invention the coating may exhibit some adhesion, as opposed to mechanical attachment, to the substrate. Thus known techniques for the bonding of coatings to substrates, for example, the use of adhesives or adhesion-promoting agents, may increase the strength of the bond between the coating and the substrate.

The coated panels of the present invention are capable of being used in a variety of end uses. For example, the panels, especially when coated with an ethylene homopolymer or ethylene-butene-1 copolymer, may be used as improved concrete form board. In this use, the coated panels have exhibited durability for repeated use many times that of form boards of the prior art in which the coating is merely laminated to the surface of the substrate. The coatings may be used to protect the substrate or to form part of a barrier, for example, a water or vapor barrier, for the construction industry. The coated panels may also be capable of being used for decorative purposes and in a variety of other end uses especially in the construction industry.

In a section of the composite structure of the present invention the substrate may be a single piece of substrate material. Alternatively, several pieces of substrate material especially pieces cut in a prearranged pattern may be used. The latter may be of particular use in the construction industry as by a suitable choice of substrate material, e.g., wood, cut in a prearranged manner and coated with a suitable thermoplastic material, e.g., polyethylene, the composite structure may be used as a concrete form board in the construction of nonplanar concrete sections. Alternatively, with, for example, a composite structure comprising polyethylene-coated wood the substrate may be cut on the construction site in the desired manner to obtain a concrete form board capable of being rapidly adapted for the construction of nonplanar concrete sections. Composite structures cut in a desired manner are capable of a variety of other end uses especially in the construction industry.

The present invention is illustrated by the following examples:

EXAMPLE I

A series of holes were drilled in a regular pattern through a rectangular sample of 0.375 inch thick "Fir-Ply" GIS plywood (trademark of Weldwood of Canada, Ltd.) measuring 5 inches by 4 inches. The centers of the holes were aligned 0.5 inch apart in each of the directions parallel and perpendicular to the edges of the sample of plywood. In different samples all the holes were either 0.0625, 0.125 or 0.250 inch in diameter. The holes were drilled right through the plywood and no "second layer", as described hereinbefore, was attached to the sample. In a particular sample the holes on one surface of the plywood were countersunk at angles of either 20°, 45°, or 60°, all holes in the sample being countersunk at the same angle. All holes countersunk at an angle of 20° and holes of a diameter of 0.0625 or 0.125 inch countersunk at an angle of 45° were countersunk to a depth of 0.125 inch, all other holes were countersunk to a depth of 0.0625 inch. The holes in the samples of plywood thus resembled the holes shown in the drawings.

A sheet of 125 mil thick thermoplastic material measuring 4 inches by 6 inches was placed in contact with the drilled sample of plywood substrate so that the countersunk section of the holes was on the side opposite from the thermoplastic and was not in contact with the thermoplastic material. The one inch excess length of thermoplastic material was located at one end of the plywood sample to facilitate subsequent testing of the coated panel. The plywood sample and sheet of thermoplastic material, which are the substrate and coating of a coated panel, were placed between brass plates treated with a release agent, e.g., silicone oil. The brass plate sandwich so formed was placed between the platens of a Dake Model 44–325 laboratory-scale press. Further details of the conditions at which the samples were prepared are given in the Tables hereinafter.

After cooling the coated panels thus formed, the panels were tested by clamping the coated panel in a horizontal plane in one jaw of the "Instron" testing machine (trademark of Instron Corporation). The other jaw of the "Instron" was clamped on the overhang of thermoplastic material. The jaws on the "Instron" were then separated vertically at one inch/minute in an attempt to measure the peel strength of the coating.

The results of a series of tests, all made with holes centered 0.5 inch from each other, are given in Table I. It will be noted that the results set out in Table I, and in the subsequent Tables, show that delamination of the coating from the substrate, in the usual sense of delamination of a coating from a substrate, occurred infrequently. Failure of the composite structure, i.e., the coated substrate, generally occurred through failure, e.g., breaking, of the substrate or failure, e.g., stretching, of the coating. The bond strength at the indicated failure is reported in the Tables.

EXAMPLE II

The procedure of Example I was repeated using 0.125 inch thick hardboard of the type available under the trademark Masonite as the substrate. All holes were countersunk to a depth of half of the thickness of the Masonite and were drilled with centers spaced at 0.5 inch intervals. The results are given in Table II.

EXAMPLE III

The procedure of Example I was repeated using 0.0625 inch thick mild sheet steel as the substrate. All holes were countersunk to a depth of half of the thickness of the sheet steel and were drilled with centers spaced at 0.5 inch intervals. The results are given in Table III.

EXAMPLE IV

The procedure of Example I was repeated using the above steel with holes of diameter 0.125 inch countersunk at an angle of 45° again with centers spaced at 0.5 inch intervals. The thermoplastic material was polyhexamethylene adipamide. The sample was pressed at 260° C.

The coating could not be removed from the substrate manually.

TABLE I

COATED PLYWOOD

| Run No. | Coating*** | Hole Size (inch) | Countersink Angle | Temp. (°C) | Time (Min.) | Pressure (lbs.) | Coating Thickness (mil) | Bond Strength** (lbs.) | Comments |
|---|---|---|---|---|---|---|---|---|---|
| 1 | A | 0.125 | 20 | 177 | 5 | 20–50 | 21 | 71 | Coating tore at hole |
| 2 | A | 0.125 | 60 | 177 | 5 | 20–50 | 32 | 136 | Coating in orifice broke |
| 3 | A | 0.250 | 20 | 177 | 5 | 0 | 50 | 140 | Coating stretched in orifice |
| 4 | A | 0.250 | 45 | 177 | 5 | 0 | 30 | 110 | Broke wood |
| 5 | A | 0.250 | 60 | 177 | 5 | 0 | 40 | 132 | Broke wood |
| 6 | B | 0.0625 | 20 | 177 | 4 | 10–20 | 25 | 72 | Coating stretched or broke in orifice |
| 7 | B | 0.0625 | 45 | 177 | 4 | 10–20 | 10 | 44 | Coating stretched or broke in orifice |
| 8 | B | 0.0625 | 60 | 177 | 4 | 10–20 | 12 | 35 | Coating stretched or broke in orifice |
| 9 | B | 0.125 | 20 | 177 | 4 | 10–20 | 12 | 102 | Coating elongated |
| 10 | B | 0.125 | 60 | 177 | 4 | 10–20 | 25 | 104 | Coating elongated |
| 11 | B | 0.250 | 20 | 177 | 4 | 0 | 35 | 110 | Coating elongated |
| 12 | B | 0.250 | 45 | 177 | 4 | 0 | 15 | 82 | Coating elongated |
| 13 | B | 0.250 | 60 | 177 | 4 | 0 | 21 | 47 | Coating elongated |
| 14 | A | 0.125 | 0 | 177 | 10 | 10–20 | 80 | 140 | Coating elongated and broke |
| 15 | B | 0.125 | 0 | 177 | 10 | 10–20 | 85 | 70 | Coating elongated and broke |
| 16 | C | 0.125 | 0 | 177 | 10 | 20–40 | 115 | 140 | Coating pulled out of orifices |
| 17 | C | 0.125 | 20 | 177 | 5 | 20–40 | 30 | 200+ | Broke wood |
| 18 | C | 0.125 | 45 | 177 | 5 | 20–40 | 35 | 200+ | Broke wood |
| 19 | C | 0.125 | 60 | 177 | 5 | 20–40 | 25 | 200+ | Broke wood |

**for 4 inch width.
*** A = ethylene-butene-1 copolymer of density 0.924 and melt index 4.0; B = "Alathon" (trademark of E. I. du Pont de Nemours and Company) 3190, an ethylene-vinyl acetate copolymer; C = ethylene homopolymer of density 0.96 and melt index 25.0.

TABLE II

COATED MASONITE

| Run No. | Coating*** | Hole Size (inch) | Countersink Angle | Temp. (°C) | Time (Min.) | Pressure (lbs.) | Coating Thickness (mil) | Bond Strength** (lbs.) | Comments |
|---|---|---|---|---|---|---|---|---|---|
| 20 | B | 0.0625 | 20 | 177 | 4 | 10–20 | 40 | 23 | Coating elongated, broke in orifice |
| 21 | B | 0.0625 | 45 | 177 | 4 | 10–20 | 55 | 43 | Coating elongated, broke in orifice |
| 22 | B | 0.0625 | 60 | 177 | 4 | 10–20 | 32 | 25 | Coating elongated, broke in |

TABLE II-continued

COATED MASONITE

| Run No. | Coating*** | Hole Size (inch) | Countersink Angle | Process Conditions Temp. (°C) | Time (Min.) | Pressure (lbs.) | Coating Thickness (mil) | Bond Strength** (lbs.) | Comments |
|---|---|---|---|---|---|---|---|---|---|
| 23 | B | 0.125 | 20 | 177 | 4 | 0 | — | — | orifice Masonite bent |
| 24 | B | 0.125 | 45 | 177 | 4 | 0 | 60 | 30 | Masonite bent |
| 25 | B | 0.125 | 60 | 177 | 4 | 0 | 45 | 35 | Masonite bent |
| 26 | B | 0.250 | 20 | 177 | 4 | 0 | 85 | 24 | |
| 27 | B | 0.250 | 45 | 177 | 4 | 0 | 58 | 21 | |
| 28 | B | 0.250 | 60 | 177 | 4 | 0 | 57 | 21 | |
| 29 | D | 0.0625 | 20 | 177 | 5 | 20–40 | 30 | 75 | |
| 30 | D | 0.0625 | 60 | 177 | 5 | 20–40 | 30 | 65 | |
| 31 | D | 0.125 | 20 | 177 | 5 | 10–20 | 52 | 83 | |
| 32 | D | 0.125 | 45 | 177 | 5 | 10–20 | 70 | 85 | |
| 33 | D | 0.125 | 60 | 177 | 5 | 10–20 | 45 | 79 | |
| 34 | A | 0.0625 | 20 | 177 | 4 | 10–20 | 30 | 43 | Masonite bent |
| 35 | A | 0.0625 | 45 | 177 | 4 | 10–20 | 20 | 51 | Masonite bent |
| 36 | A | 0.0625 | 60 | 177 | 4 | 10–20 | 24 | 44 | Masonite bent |
| 37 | A | 0.125 | 20 | 177 | 4 | 10–20 | 33 | 43 | Masonite bent |
| 38 | A | 0.125 | 45 | 177 | 4 | 10–20 | 30 | 46 | Masonite bent |
| 39 | A | 0.125 | 60 | 177 | 4 | 10–20 | 30 | 40 | Masonite bent |

***A and B as defined in Table I.   D = ethylene homopolymer of density 0.960 and melt index 0.4.
**for 4 inch width.

TABLE III

COATED METAL

| Run No. | coating*** | Hole Size (inch) | Countersink Angle | Process Conditions Temp. (°C) | Time (Min.) | Pressure (lbs.) | Coating Thickness (mil) | Bond Strength** (lbs.) | Comments |
|---|---|---|---|---|---|---|---|---|---|
| 40 | B | 0.0625 | 20 | 177 | 4 | 10–20 | 80 | 35 | Coating elongated, broke in orifice |
| 41 | B | 0.0625 | 45 | 177 | 4 | 10–20 | 70 | 29 | Coating elongated, broke in orifice |
| 42 | B | 0.0625 | 60 | 177 | 4 | 10–20 | 90 | 25 | Coating elongated, broke in orifice |
| 43 | B | 0.125 | 20 | 177 | 4 | 0 | 100 | 33 | Coating elongated, broke in orifice |
| 44 | B | 0.125 | 45 | 177 | 4 | 0 | 70 | 81 | Coating elongated, broke in orifice |
| 45 | B | 0.125 | 60 | 177 | 4 | 0 | 82 | 98 | Coating elongated, broke in orifice |
| 46 | B | 0.250 | 20 | 177 | 4 | 0 | 112 | 63 | Coating elongated, broke in orifice |
| 47 | B | 0.250 | 45 | 177 | 4 | 0 | 85 | — | Bent metal |
| 48 | B | 0.250 | 60 | 177 | 4 | 0 | 110 | — | Bent metal |
| 49 | D | 0.0625 | 45 | 177 | 5 | 10–20 | 100 | 36 | Coating broke in orifice |
| 50 | D | 0.0625 | 60 | 177 | 5 | 10–20 | 100 | 22 | Coating broke in orifice |
| 51 | D | 0.125 | 45 | 177 | 5 | 10–20 | 70 | 215+ | Metal bent |
| 52 | D | 0.125 | 60 | 177 | 5 | 10–20 | 80 | 250+ | Metal bent |
| 53 | A | 0.0625 | 20 | 177 | 4 | 10–20 | 75 | 13 | Coating elongated in orifice |
| 54 | A | 0.0625 | 45 | 177 | 4 | 10–20 | 60 | 13 | Coating elongated in orifice |
| 55 | A | 0.0625 | 60 | 177 | 4 | 10–20 | 90 | 24 | Coating elongated in orifice |
| 56 | A | 0.125 | 20 | 177 | 4 | 0 | 90 | 73 | Coating pulled out of orifices |
| 57 | A | 0.125 | 45 | 177 | 4 | 0 | 90 | 108 | Coating pulled out of orifices |
| 58 | A | 0.125 | 60 | 177 | 4 | 0 | 80 | 120 | Bent metal |
| 59 | A | 0.250 | 45 | 177 | 4 | 0 | 50 | 200+ | Bent metal |
| 60 | A | 0.250 | 60 | 177 | 4 | 0 | 70 | 200+ | Bent metal |
| 61 | A | 0.125 | 0 | 177 | 5 | 10–20 | 109 | 35 | Coating pulled out of orifices |
| 62 | B | 0.125 | 0 | 177 | 4 | 10–20 | 113 | 43 | Coating pulled out of orifices |

***A and B as defined in Table I; D as defined in Table II.
**for 4 inch width.

I claim:

1. In an improved, reusable concrete form board comprising a composite structure having a coating of a normally solid polyolefin resin at least 10 mils thick on a plywood substrate, the improvement which comprises:

a. providing the substrate with a plurality of circular orifices at its coated surface each having a cross-sectional area in the range of 0.01 to 0.05 square inch disposed over at least the coated surface thereof and spaced with centers from 0.5 to 2 inches apart, said orifices leading into first, cylindrical portions of the holes extending from the coated surface of the solid substrate to a junction line, inside the solid substrate, with a frustoconical portion of the holes whose sides are at an angle in the range of 20°–60° with the vertical axis of the holes and whose cross-sectional area, for at least a part of their depth, increases at least 10% as the distance from said junction line increases, and b. providing that the normally solid polyolefin resin coating the surface of said substrate penetrates through said orifices and into said holes beyond said junction lines where the cylindrical and frustoconical sections of the holes meet for at least a distance such that the cross-sectional area is at least 10% greater than the area of the orifice at the coated surface of the solid substrate.

2. The composite structure of claim 1 in which the polyolefin resin is a homopolymer of ethylene having a density greater than 0.935 g/cm$^3$ and a melt index in the range of 0.2 to 30.0.

3. The composite structure of claim 1 in which the polyolefin resin is a copolymer of ethylene with a higher 1-olefin.

4. The composite of claim 3 in which the higher 1-olefin is 1-butene and the copolymer of ethylene has a density greater than 0.935 g/cm$^3$ and a melt index in the range of 0.2 to 30.0.

5. The composite structure of claim 1 in which the depth of the holes is equal to the thickness of the plywood substrate.

6. The composite structure of claim 1 in which the depth of the holes is less than the thickness of the plywood substrate and the plywood substrate is a laminate of two or more sheets of plywood.

7. The composite structure of claim 1 in which the substrate is planar.

8. The composite structure of claim 1 in which the coating of a polyolefin resin has a thickness in the range of 30 to 100 mils.

* * * * *